US011797971B2

(12) United States Patent
Vyas et al.

(10) Patent No.: US 11,797,971 B2
(45) Date of Patent: *Oct. 24, 2023

(54) SYSTEMS AND METHODS GENERATING ELECTRONIC TOKENS IN RESPONSE TO USER LOCATION

(71) Applicant: PayPal, Inc., San Jose, CA (US)

(72) Inventors: Adhish Nayanendu Vyas, Gilroy, CA (US); Vidit Nayankumar Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/566,932

(22) Filed: Dec. 31, 2021

(65) Prior Publication Data

US 2022/0164783 A1 May 26, 2022

Related U.S. Application Data

(63) Continuation of application No. 17/243,490, filed on Apr. 28, 2021, which is a continuation of application No. 15/804,843, filed on Nov. 6, 2017, now Pat. No. 10,997,577.

(51) Int. Cl.
*G06Q 20/32* (2012.01)
*G06Q 20/38* (2012.01)

(52) U.S. Cl.
CPC ..... *G06Q 20/3224* (2013.01); *G06Q 20/3821* (2013.01)

(58) Field of Classification Search
CPC .................. G06Q 20/3224; G06Q 20/3821
See application file for complete search history.

(56) References Cited

U.S. PATENT DOCUMENTS

| 6,839,560 | B1 | 1/2005 | Bahl et al. |
| 9,414,348 | B2 * | 8/2016 | Saari ..................... H04W 64/00 |
| 10,997,577 | B2 | 5/2021 | Vyas et al. |
| 2002/0073045 | A1 | 6/2002 | Rubin et al. |
| 2013/0173474 | A1 * | 7/2013 | Ranganathan ..... G06Q 20/0655 705/67 |
| 2014/0113674 | A1 | 4/2014 | Joseph et al. |
| 2014/0315571 | A1 | 10/2014 | Saari et al. |
| 2016/0019536 | A1 * | 1/2016 | Ortiz ....................... G06Q 20/36 705/67 |
| 2018/0047016 | A1 * | 2/2018 | Sarin .................. G06Q 20/3674 |
| 2019/0139023 | A1 | 5/2019 | Vyas et al. |

OTHER PUBLICATIONS

International Appl No. PCT/US2018/059501, International Search Report and Written Opinion dated Feb. 12, 2019, 12 pages.
International Preliminary Report on Patentability for Application No. PCT/US2018/059501 dated May 22, 2020, 10 pages.

* cited by examiner

*Primary Examiner* — Bennett M Sigmond
*Assistant Examiner* — Marla Hudson
(74) *Attorney, Agent, or Firm* — Haynes and Boone, LLP

(57) ABSTRACT

A system, including: a non-transitory memory; and one or more hardware processors coupled to the non-transitory memory and configured to read instructions from the non-transitory memory to cause the system to perform operations including: determining a first physical location of a user; comparing the first physical location to data indicative of network availability; and in response to comparing the first physical location to data indicative of network availability, generating a first electronic token and a second electronic token for a mobile computing device associated with the user.

20 Claims, 6 Drawing Sheets

SYSTEMS AND METHODS GENERATING ELECTRONIC TOKENS IN RESPONSE TO USER LOCATION

CROSS-REFERENCE TO RELATED APPLICATIONS

This application is a continuation application of U.S. patent application Ser. No. 17/243,490, filed Apr. 28, 2021, which claims priority to and is a continuation of U.S. patent application Ser. No. 15/804,843 filed Nov. 6, 2017, now U.S. Pat. No. 10,997,577, and entitled "SYSTEMS AND METHODS GENERATING ELECTRONIC TOKENS IN RESPONSE TO USER LOCATION" which is incorporated herein by reference in its entirety.

BACKGROUND

Field of the Disclosure

The present disclosure generally relates to electronic and/or mobile computing device transactions, and more particularly to systems and methods generating electronic tokens in response to user location.

Related Art

More and more consumers are purchasing items and services and/or otherwise conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile transaction service provider such as, for example, PayPal, Inc. of San Jose, Calif. Such electronic transaction service providers can make transactions easier and safer for the parties involved. Conducting transactions with the assistance of a service provider from the convenience of virtually anywhere using a mobile device is one main reason why on-line and mobile transactions are growing very quickly.

An example related use case includes a consumer having a mobile device and an application on that mobile device, where the application enables a transaction to be conducted by the mobile device at a merchant's point-of-sale (POS). For instance, the user may provide payment information visually on a screen of the device (e.g., a Quick Response or QR code) or otherwise (e.g., near field communication methods). The POS reads the payment information either visually or otherwise and submits that information to a backend server or device. However, in some instances, the user's mobile device may experience difficulty accessing a data network. For instance, there may be poor cellular data signal strength or poor Wi-fi signal strength hampering communication between the mobile device and the user's service provider, and the lack of connectivity may prevent or drastically slow downloading needed information for the service provider to the application on the mobile device.

Thus, there is a need for systems and methods capable of providing satisfactory performance even in areas of inadequate data network signal strength.

Figure 1:
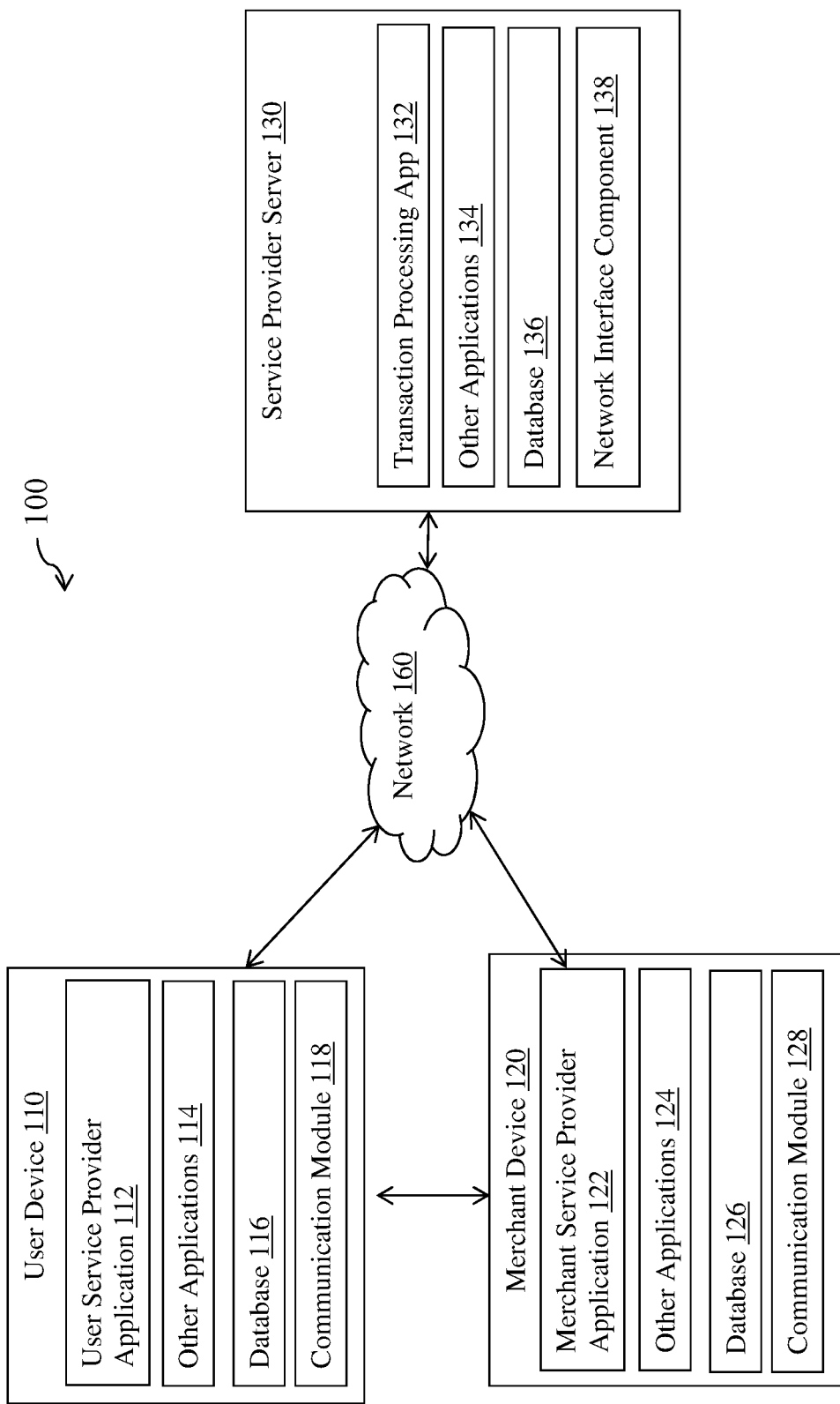
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing electronic transaction services even in areas with poor network availability. In one example, an application on the user's mobile device or a server of an electronic transaction services provider may learn areas of low network access where the user often conducts electronic transactions, such as purchase, and then stores extra electronic tokens when the user enters such an area. Another embodiment may include generating and storing extra tokens when low signal strength is detected by the user's mobile device. Possible advantages may include uninterrupted transactions for the user even when a data network is unavailable.

In one example use case, a user carries a mobile device that has an electronic transaction services provider application running thereon. The electronic transaction services provider application runs on an operating system (OS) of the mobile device, and the OS of the mobile device provides access to signal strength information and to location information of the mobile device for use by the electronic transaction services provider application. The user is mobile and may travel from an area of good data network availability to an area of poor data network availability. The electronic transaction services provider application accesses the signal strength information periodically and ascertains that the user is experiencing a reduction in network availability. For example, the electronic transaction services provider application may compare signal strength to a threshold, where signal strength quality below the threshold is indicative of a reduction in network availability.

In response to detecting the reduction in network availability, the electronic transaction services provider application then determines the physical location of the user. For instance, the electronic transaction services provider application may access the location information and then, having the location information, compare that location information to data indicative of network availability. The data indicative of network availability may include, e.g., pre-programmed coverage map data or a table of pre-programmed locations indicating known weak spots of the network.

In some instances, real-time location information at the mobile device (e.g., global positioning system, or GPS, information) may be a drain on battery, so the OS may turn on location services at periodic intervals or upon specific request by an application. Therefore, some embodiments of the electronic transaction services provider application may request real-time location information from the OS at longer periodic intervals or when detecting poor signal strength, rather than continually at very short periodic intervals. Such feature may help to save battery life, which is increasingly important as mobile computing devices use more and more processing power associated with increased functionality.

In another example, the electronic transaction services provider application may know in advance of events at large venues that cause a loss of network connectivity (e.g., a music festival or car race) when the people present use substantially all available cellular channels. Such information may be saved in map data or table data that correlates locations with network availability. Upon detecting that a user is approaching such known area, the system may generate electronic tokens, as described below. In yet another example, when a user inputs her destination in a navigation application, the electronic transaction services provider application determines that the destination or different places along the route have scarce network availability irrespective of the user's current location.

The electronic transaction services provider application may further use the physical location of the user to query merchant data and transaction history data, such as purchases. Upon determining that the user is within a distance threshold of a particular merchant, the electronic transaction services provider application may then request generation of electronic tokens from the electronic transaction services provider. The electronic transaction services provider application may then store the electronic tokens, e.g., in a secure area of the user's device to prevent theft or fraud. In some instances, the electronic transaction services provider application may determine that the user is within the threshold distance of a merchant with whom the user has a history of transactions. Accordingly, the system may generate the tokens in an amount that corresponds to an approximate value of past purchases or may generate extra tokens above the default amount.

Continuing with the example, the user may continue into the area of poor network availability and desire to conduct a transaction from the merchant. The payment services provider application may use the stored electronic tokens for the transaction, even if the user's mobile device is off-line or otherwise has inadequate data network service. Accordingly, the transaction may be carried out despite a lack of adequate data network service on the part of the user.

The embodiments described above use predictive techniques to generate the electronic transaction tokens. For instance, as noted above, some embodiments may monitor location and signal strength to determine that a user is entering an area of known inadequate data network availability. Further, some embodiments may use pre-programmed information about location of merchants and even the user's prior transaction history to determine that it is likely that the user may desire to enter into a transaction in the area of known inadequate data network availability. Thus, the pre-authorization of electronic tokens and storing of electronic tokens on the user's mobile device may be performed by taking into account data network availability, user location, and even purchase history, thereby providing an advantage of allowing merchants and customers to enter into transactions even if a user's mobile device may not be able to adequately access the data network.

Further, continuing with the example, the user may have used some of the tokens but not all of the tokens saved to the mobile device. The electronic transaction services provider application may further track the user's location and cancel the remaining tokens on the mobile device in response to determining that the user's location is outside of a distance threshold to the merchant or in response to determining that the user's mobile device has adequate data network coverage. Accordingly, an advantage may include deleting those electronic tokens that are not used, thereby reducing the possibility of theft or fraud.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a merchant device 120, and a service provider server 130, in communication over a network 160. A user (not shown) may utilize user device 110 for a variety of different functions, including making purchases via user service provider application 112.

User device 110, merchant device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with merchant device 120 and/or service provider server 130. For example, in one embodiment, user device 110 may be implemented as a personal computer (PC), a smart phone, laptop/tablet computer, wristwatch with appropriate computer hardware resources, eyeglasses with appropriate computer hardware, other type of wearable computing device, implantable communication devices, and/or other types of computing devices capable of transmitting and/or receiving data, such as an IPAD® from APPLE®. Examples of operating systems for use with user device 110 include iOS® OS, Android® OS, and the like. User device 110 managed or controlled by any suitable processing device. Although only one user device 110 is shown, a plurality of like user devices may function similarly.

User device 110 of FIG. 1 contains a user service provider application 112, other applications 114, a database 116, and a communication module 118. User service provider application 112 and other applications 114 may correspond to executable processes, procedures, and/or applications with associated hardware. In other embodiments, user device 110 may include additional or different modules having specialized hardware and/or software as required.

User service provider application 112 may correspond to one or more processes to execute modules and associated devices of user device 110 to initiate, receive, and/or process/complete transactions using services provided by service provider server 130. In this regard, user service provider application 112 may correspond to specialized hardware and/or software utilized by user device 110 to provide an interface to permit the user associated with user device 110 to select payment options and provide payment for items, for example, to a merchant through merchant device 120 using service provider server 130.

In various embodiments, user service provider application 112 may also provide payments and/or transfers to users and/or groups of users, for example, payments to individual sellers or friends for items and/or transfers between known associates. User service provider application 112 may be implemented as a user interface enabling the user to enter payment options for storage by user device 110 (e.g., using a digital wallet), select and provide payment options on checkout/payment of one or more items with a merchant, and complete a transaction for the item(s) through a purchase request for the item(s). In various embodiments, user service provider application 112 may correspond to a general browser application configured to retrieve, present, and communicate information over the Internet (e.g., utilize resources on the World Wide Web) or a private network. For example, user service provider application 112 may provide a web browser, which may send and receive information over network 160, including retrieving website information, presenting the website information to the user, and/or communicating information to the website, including payment information. However, in other embodiments, user service provider application 112 may include a dedicated application of service provider server 130 or other entity (e.g., a merchant), which may be configured to assist in processing electronic transaction requests. User service provider application 112 may be utilized to establish and/or maintain a user account and/or digital wallet with service provider server 130.

In an example embodiment, user service provider application 112 may facilitate a transaction between user device 110 and merchant device 120. For instance, during a transaction, user service provider application 112 may communicate with merchant service provider application 122 using, e.g., near field communication (NFC), Bluetooth®, Wi-Fi, or the like. In response to a signal from a merchant service provider application 122 indicating a transaction amount, user service provider application 112 may present one or more electronic tokens to merchant service provider application 122 for payment.

Examples of tokens include open-loop tokens and closed-loop tokens. An example of an open loop token includes a credit card number. Upon receipt of the open loop token, merchant service provider application 122 sends a message over network 160 to transaction processing application 132 to verify the credit card number and also to verify that credit equal to or exceeding the amount of the transaction exists for that credit card number. Assuming that the number is valid and that credit is adequate, the transaction processing application 132 then puts a debit on the account for the amount and sends a transaction complete message over network 160 to the merchant service provider application 122. The merchant service provider application 122 then sends a message to the user service provider application 112 indicating completion of the transaction and providing, e.g., a receipt. The user service provider application 112 may, in response, provide a notification to the user.

Another example of a token includes a closed-loop token. The closed loop token may correspond to some ID for the user corresponding to user device 110, such as a name, email, address, digital wallet ID, payment instrument ID, or other funding source token. Such information may further be encrypted before being tokenized. The closed loop token may further include information such as a pre-authorized amount, information limiting the token for use to a particular merchant, and the like. In an example use case, the closed-loop token may be presented by the user service provider application 112 to the merchant service provider application 122 via NFC, Bluetooth®, Wi-Fi, QR code, or the like. The merchant service provider application 122 sends a message over network 160 to transaction processing application 132 to verify the token. Assuming that the token is valid, the transaction processing application 132 then debits the account of the user for the amount of the transaction and sends a transaction complete message over network 160 to the merchant service provider application 122. The merchant service provider application 122 then sends a message to the user service provider application 112 indicating completion of the transaction and providing, e.g., a receipt.

One difference between open-loop tokens and closed-loop tokens is that open-loop tokens may be processed using a credit card backend. By contrast, closed-loop tokens may be proprietary to the particular service provider so that the merchant may have a pre-existing relationship with the particular service provider in order to accept payment through the service provider's system.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM (instant messaging) applications that allow a user to send and receive emails, calls, texts, and other notifications through network 160. Other applications 114 may also include other location detection applications, such as a mapping, compass, and/or GPS application, which may be used to determine a physical location for the user. For instance, other applications 114 may include a GPS location module that may be accessed by user service provider application 112 via the OS of user device 110 to request information indicating a physical location of the user. Furthermore, user service provider application 112 may provide user location data to the service provider server 130, when appropriate.

Other applications 114 may further include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

User device 110 may further include database 116 stored to a memory of user device 110, which may store various applications and data and be utilized during execution of various modules of user device 110. Thus, database 116 may include, for example, IDs such as operating system registry entries, cookies associated with user service provider application 112 and/or other applications 114, IDs associated with hardware of user device 110, or other appropriate IDs, such as IDs used for payment/user/device authentication or identification.

Database 116 may also include historical location information of the user, historical shopping or transaction information of the user, and may include pre-programmed map data correlated with network signal strength data or a table of pre-programmed locations correlated with network signal strength data. User service provider application 112 may access database 116 and use such information to provide the predictive token generation features described herein. Additionally, or alternatively, such information may be saved at database 136 at service provider server 130, where either or both of user service provider application 112 and transaction processing application 132 may access such data. The pre-programmed information may be refreshed at a fixed time intervals or other appropriate times.

User device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth®, and NFC devices.

Merchant device 120 may be maintained, for example, by a merchant having a physical retail location where a user may purchase one or more items. In this regard, merchant device 120 may include a device having processing applications, which may be configured to interact with user device 110 and/or service provider server 130 to engage in transactions, including over short range wireless communications with user device 110 for exchange of transaction information and token data. Merchant device 120 may be implemented using any appropriate hardware and software configured for wired and/or wireless communication with user device 110 and/or service provider server 130. For example, in one embodiment, merchant device 120 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 120 of FIG. 1 contains a merchant service provider application 122, other applications 124, a database 126, and a communication module 128. Merchant payment service application 122 and other applications 124 may correspond to processes, procedures, and/or applications executable by a hardware processor, for example, a software program. In other embodiments, merchant device 120 may include additional or different modules having specialized hardware and/or software as required.

Merchant service provider application 122 may correspond to one or more processes to execute modules and associated specialized hardware of merchant device 120 that provide checkout and payment processes for a transaction to purchase one or more items for sale from the merchant corresponding to merchant device 120. In this regard, merchant service provider application 122 may correspond to specialized hardware and/or software of merchant device 120 to provide a convenient interface to permit a merchant to enter, view, and/or edit items and/or services for purchase by a user. For example, merchant service provider application 122 may be implemented as an application having a user interface enabling the merchant to enter item information and request payment for a transaction on checkout/payment of one or more items/services.

In certain embodiments, merchant service provider application 122 may correspond more generally to a web browser configured to view information available over the Internet or access a website corresponding to the merchant and/or service provider server 140. Thus, merchant service provider application 122 may provide item sales through an online marketplace using the website of the merchant. Merchant service provider application 122 may also alert users, such as consumers at a merchant location, of acceptance of payment using processes and features provided by service provider server 130.

As described above, merchant service provider application 122 may receive one or more tokens from user service provider application 112 during a transaction, may communicate with transaction processing application 132 to verify a token and receive confirmation of payment. Furthermore, merchant service provider application 122 may further communicate with user service provider application 112 to indicate that a transaction is complete. In some embodiments, merchant device 120 may be implemented as a point-of-sale (POS) system, having a monitor and user interface for interacting with merchant personnel and include payment acceptance devices, such as card readers, NFC-based tap readers, QR code readers, and the like.

Merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 160, or other types of applications. Other applications 124 may also include email, texting, voice and IM (instant messaging)_applications that allow a user to send and receive emails, calls, texts, and other notifications through network 160. In various embodiments, other applications 124 may include financial applications, such as banking, online payments, money transfer, or other applications associated with service provider server 130. Other applications 124 may contain software programs, executable by a processor, including a graphical user interface (GUI) configured to provide an interface to the user.

Merchant device 120 may further include database 126 which may include, for example, IDs such as operating system registry entries, cookies associated with merchant service provider application 122 and/or other applications 124, IDs associated with hardware of merchant device 120, or other appropriate IDs, such as IDs used for payment/user/device authentication or identification. IDs in database 126 may be used by a payment/credit provider, such as service provider server 130, to associate merchant device 120 with a particular account maintained by the payment/credit provider. Database 126 may further include transaction information and/or results.

Merchant device 120 includes at least one communication module 128 adapted to communicate with user device 110 and/or service provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth®, and near field communication devices.

Service provider server 130 may be maintained, for example, by an online or mobile electronic transaction service provider, which may provide payment services and/or processing for electronic transactions on behalf of users. In this regard, service provider server 130 includes one or more processing applications which may be configured to interact with user device 110, merchant device 120, and/or another device/server to facilitate payment for a transaction, including establishment of accounts and configuration of mobile device applications to use an acceptance mechanism for electronic payments by a merchant. In one example, service provider server 130 may be provided by PAYPAL®, Inc. of San Jose, Calif., USA. However, in other embodiments, service provider server 130 may be maintained by or include a credit provider, payment services provider, financial data provider, and/or other service provider, which may provide payment services to the user.

Service provider server 130 of FIG. 1 includes a transaction processing application 132, other applications 134, a database 136, and a network interface component 138. Transaction processing application 132 and other applications 134 may correspond to executable processes, procedures, and/or applications with associated hardware. In other embodiments, service provider server 130 may include additional or different modules having specialized hardware and/or software as required.

Transaction processing application 132 may correspond to one or more processes to execute modules and associated specialized hardware of service provider server 130 to receive and/or transmit information from user device 110 for establishing payment accounts, as well as processing and completing of one or more transactions between the user of user device 110 and the merchant of merchant device 120. In this regard, transaction processing application 132 may correspond to specialized hardware and/or software to establish user accounts, which may be utilized to send and receive electronic data needed to facilitate electronic transactions.

A user associated with user device 110 may establish an account with transaction processing application 132 by providing personal and/or financial information to service provider server 130 and selecting an account login, password, and other security information. The account may be used for conducting an electronic transaction, such as to send and receive payments.

As described above, transaction processing application 132 may receive a transaction request from merchant device 120 for a transaction between the user of user device 110 and the merchant for merchant device 120, which may include IDs, tokens, or other data used for transaction processing. The transaction is completed and payment is provided, as described in more detail herein.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing service provider server 130. In various embodiments where not provided by transaction processing application 132, other applications 134 may include connection and/or communication applications, which may be utilized to communicate information over network 160.

Additionally, service provider server 130 includes database 136. As previously discussed, the entity corresponding to merchant device 120 may establish one or more payment accounts with service provider server 130. Payment accounts in database 136 may include entity information, such as name, address, birthdate, payment/funding information, additional user financial information, and/or other desired user data. The entity may link to their respective payment accounts and/or digital wallets through an account, user, merchant, and/or device ID, as well as a generated token, which may be provided to user device 110 and/or merchant device 120 for use.

Furthermore, as noted above, database 136 may also include user transaction history information for a multitude of users, including the user at user device 110, user location history, and map or table data correlating locations with network signal strength. Thus, in determining whether to generate tokens in response to a user's location and signal strength, such action may be performed by either or both of user service provider application 112 or transaction processing application 132 by accessing data at either database 116 or database 136. An example of user transaction history includes dates, locations, and amounts of transactions by a particular user for a variety of merchants. That data may then be parsed by either user service provider application 112 or transaction processing application 132 to determine if a user is approaching a physical location associated with a merchant. The data may also be parsed to determine amounts that are associated with those transactions. For instance, if a user buys lunch at a particular merchant three times a week and spends an average of $10 for lunch at that merchant, the data may be parsed to determine that the transactions are approximately $10, and that information may further be used to generate tokens in appropriate amounts.

In various embodiments, service provider server 130 includes at least one network interface component 138 adapted to communicate with user device 110 and/or merchant device 120 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
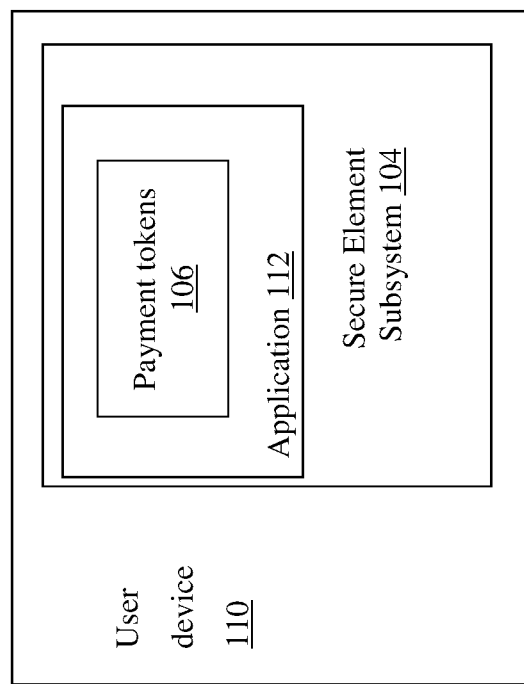
FIG. 2 is a schematic diagram of an example user device according to the embodiment of FIG. 1.

FIG. 2 is another illustration of example user device 110, according to one embodiment. The example of FIG. 2 leaves out some features that were shown in FIG. 1 for ease of illustration. In this example, user service provider application 112 is implemented at least in part in the secure element subsystem 104 of the user device 110. For instance, the user service provider application 112 may store the generated electronic tokens 106 within the secure element subsystem 104. In some examples, the secure element subsystem 104 may include specialized memory hardware that is encrypted and tamper resistant, thereby providing some amount of deterrence against theft or fraud. The electronic tokens 106 may be retrieved from the secure element subsystem 104 by the application 112 as desired during a transaction.

Figure 3:
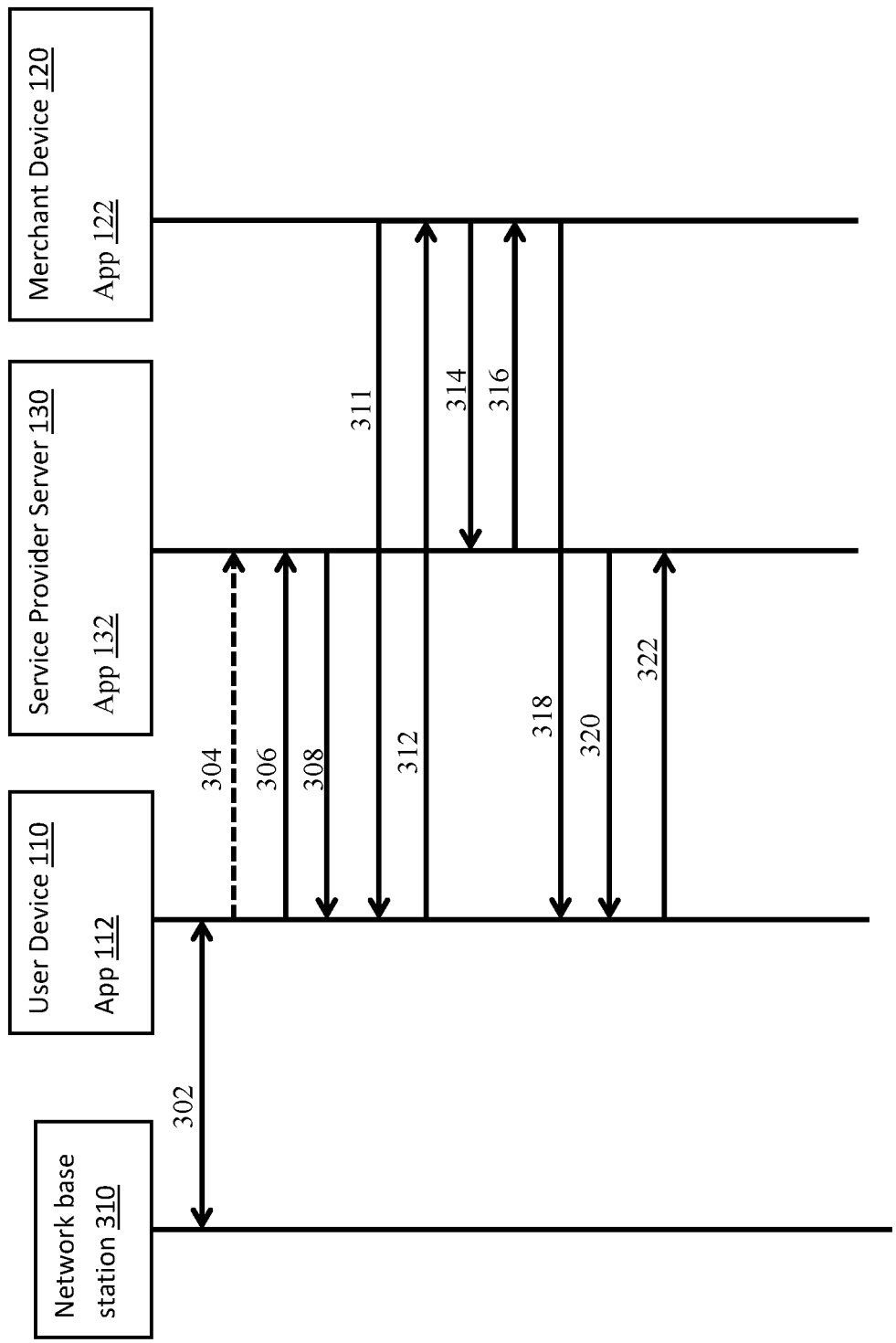
FIG. 3 is a signal diagram of an example technique for providing electronic tokens, according to one embodiment.

FIG. 3 is a signal diagram, adapted according to one embodiment. The signal diagram of FIG. 3 illustrates a relationship among network base station 310, user device 110, service provider server 130, and merchant device 120. User device 110, service provider server 130, and merchant device 120 are described in more detail above with respect to FIG. 1. In some examples, network base station 310 may include a cellular base station, such as used with Long Term Evolution (LTE) or other 4G networks, 3G networks, 5G networks, and the like. In other examples, network base station 310 may include a IEEE 802.11 Wi-Fi access point or other wireless base station.

During normal operation, user device 110 communicates with network base station 310 to transfer data, to confirm presence, and the like. Such relationship is shown at signals 302. During normal operation, user device 110 includes applications (e.g., 114) to examine signal strength and signal quality and to provide data indicative of network availability. One example includes a graphical user interface for a smart phone that includes a number of "bars" to provide a user with an indication of signal strength. Although not shown in FIG. 3, user device 110 may include another application (e.g., 114) to determine a physical location of the user device 110. Examples of applications to determine the physical location of the user include global positioning system (GPS) and Assisted GPS applications.

Continuing with the example, the user service provider application 112 of user device 110 accesses the data indicative of network availability as well as data indicative of the physical location of the user. The user service provider application 112 may access the data indicative of network availability in any of a variety of ways. In one example, the user service provider application 112 may directly access signal strength information via the operating system of the user device 110 and application to examine signal strength and signal quality. In another example, user service provider application 112 may access data in the database 116 or 136 that correlates geographic location and signal strength. Such information may be on a per-provider basis, assuming that different providers have different signal strength maps.

In another embodiment, the user service provider application 112 at the user device 110 may send the user location information to the service provider server 130, which provides further processing. Such action is shown with a dashed line at signal 304.

The user service provider application 112 then compares the physical location of the user to the data indicative of network availability. For instance, the user service provider application 112 may parse the database 116 or 136 to determine whether the physical location of the user is within a threshold distance of a known area of reduced network availability, e.g., below a predetermined threshold for signal strength. An example may include a mall that has poor reception for a cellular data provider associated with the user device 110. Another example may include a racetrack or other venue where it is expected that a large number of people may use substantially all of the available communication channels, thereby overwhelming network base station 310. Furthermore, the comparison of the physical location of the user to the data indicative of network availability may include examining a motion of the user and noting that the user is approaching one or more known areas of reduced network availability. Additionally, the information database 116 and 136 may also correlate the particular user's transaction history with the data indicative of network availability, thereby allowing the user service provider application 112 to determine that the user may be approaching a merchant with whom the user has a transaction history. Of course, comparing the physical location of the user to the data indicative of network availability and to transaction history data may also be performed by application 132 at the service provider server 130.

In response to comparing the physical location of the user to the data indicative of network availability and transaction history data, the user service provider application 112 then either generates tokens itself or requests that the transaction processing application 132 generate tokens and send those tokens to user device 110. An example of a request from the user service provider application 112 to the transaction processing application 132 is shown as signal 306. Signal 308 indicates tokens being issued from the transaction processing application 132 to the user service provider application 112. As noted above, the tokens may be open loop tokens or closed loop tokens and in any event may include data representing alphanumeric strings. In some instances, the tokens may be merchant-specific, thereby limiting the tokens to being used for payment at specific merchants. In the case of an open-loop token, data indicating merchant-specific qualities of tokens may be saved at database 136 and may be enforced after presentation for payment by a merchant. On the other hand, closed loop tokens may include data in the alphanumeric string of the tokens themselves indicating merchant specificity.

Signals 304, 306, 308 may be performed using any appropriate protocol, including a cellular data protocol, such as through network base station 310, or other network protocol.

Continuing with the example, the user device 110 stores the electronic tokens, and the user travels into the area of reduced network availability. While in the area of reduced network availability, the user desires to enter into a transaction with a merchant associated with the merchant device 120. The merchant device 120 communicates with the user device 110 by any appropriate method, including NFC, Bluetooth®, Wi-Fi, or the like. For instance, the merchant service provider application 122 may send a message 310 to the user service provider application 112 providing an identification of the merchant, and amount of the purchase, and other needed information to complete the transaction. In response, the user service provider application 112 sends message 312, which includes one or more electronic tokens.

Although the area is an area of reduced network availability for the user device 110, the example assumes that the merchant device 120 has adequate network availability in order to pass a payment request to the transaction processing application 132 by message 314, which includes the tokens. The transaction processing application 132 verifies the tokens, verifies the available credit or balance, and sends message 316 to merchant service provider application 122 to confirm payment. Merchant service provider application 122 sends message 318 to the user service provider application 112 to verify that the transaction is complete and to provide a receipt. The service provider then settles with the merchant by crediting an account of the merchant's with an amount conforming to the purchase amount (not shown).

While the user has paid for the transaction with some of the tokens, at least one of the tokens is left over and is still stored on the user device 110. Subsequently, the user leaves the area to return home or to go to a different location. In any event, the user has subsequent movement that takes the user out of the area of known reduced network availability, or at least past the threshold. The user service provider application 112, having access to the location data and the data indicative of network availability, discerns that the user is leaving the area of reduced network availability and in response deletes the remaining tokens. For instance, the user service provider application 112 may react to determining that the user has moved to a second physical location outside of the area of known reduced network availability or it may react to discerning an increase in network availability. The user service provider application 112 may simply delete the remaining tokens from the memory of the user device 110. In another example, the service provider server 130 may be aware of the location of the user device 110 and may cause transaction processing application 132 to send an instruction to user service provider application 112 to delete the remaining tokens. An example is shown at signal 320.

The user service provider application 112 then sends message 322 to transaction processing application 132 to indicate deletion of the electronic tokens. In response, the transaction processing application 132 releases a hold on funds (if any) associated with those remaining tokens.

Figure 4:
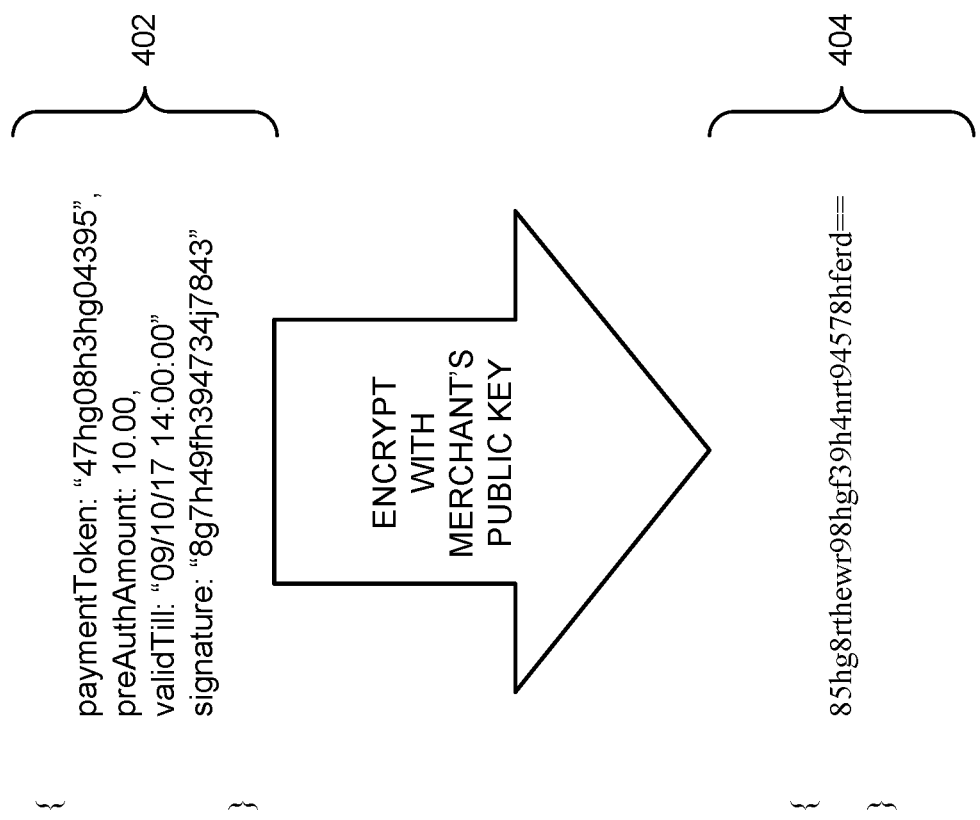
FIG. 4 is an illustration of an example token, according to one embodiment.

FIG. 4 is an illustration of an example closed loop token, according to one embodiment. As noted above, tokens that may be used for transactions in various embodiments include open loop tokens (e.g., credit card numbers) as well as closed loop tokens using alphanumeric strings specific to a particular electronic transaction service provider.

In one example, the closed loop token of FIG. 4 is encrypted using the merchant's public key before being transferred to the merchant service provider application 122 by user service provider application 112. In some cases, the user service provider application 112 may perform the encrypting, or the token may be encrypted by the transaction processing application 132 before being sent to the user service provider application 112. An example of an encrypted token is shown by information 404.

The merchant receives the token and decrypts the token using the merchant's private key. Information 402 is an illustration of the data as it might appear after decryption. The token includes a field named "paymentToken" which is used by the transaction processing application 132 as a key to match to a database entry to identify an account associated with the user. The field "preAuthAmount" indicates an amount that is guaranteed; the field "validTill" provides a time through which the token is valid. The "signature" field shows the signed value of the message when signed by the payment service provider's private key The merchant may verify the signature using the payment services provider's public key, thereby assuring the merchant of the authenticity of the token.

Various embodiments may use a closed-loop token such as the one shown in FIG. 4 to allow for processing off-line transactions by merchants. For instance, the merchant service provider application 122 may receive a token, such as the one in FIG. 4, for conducting a transaction. The merchant may verify the signature using the service provider's public key instead of using messages over a network to verify the token. In an example in which network access is available to the merchant but may be inconvenient (e.g., during a lunch rush hour when time is valuable), the signature in the token ensures payment by the services provider, and thus the merchant may complete the transaction with the user without going online in real-time. At a time that is more convenient, the merchant may then send the token to the services provider for payment. In another example, a merchant may batch and send the transactions when payment processing is cheaper (e.g., if a payment processor offers different pricing based on time of day so that the merchants is incentivized to defer processing to off-peak times and receive a discount in payment processing). Accordingly, various embodiments may use the closed loop token of FIG. 4 in order to save transaction processing time during inconvenient times. Furthermore, in an instance in which the merchant is off-line but expects to resume network connectivity later (e.g., such as during a network outage) the merchant may still accept such tokens for payment and be ensured of payment.

Figure 5:
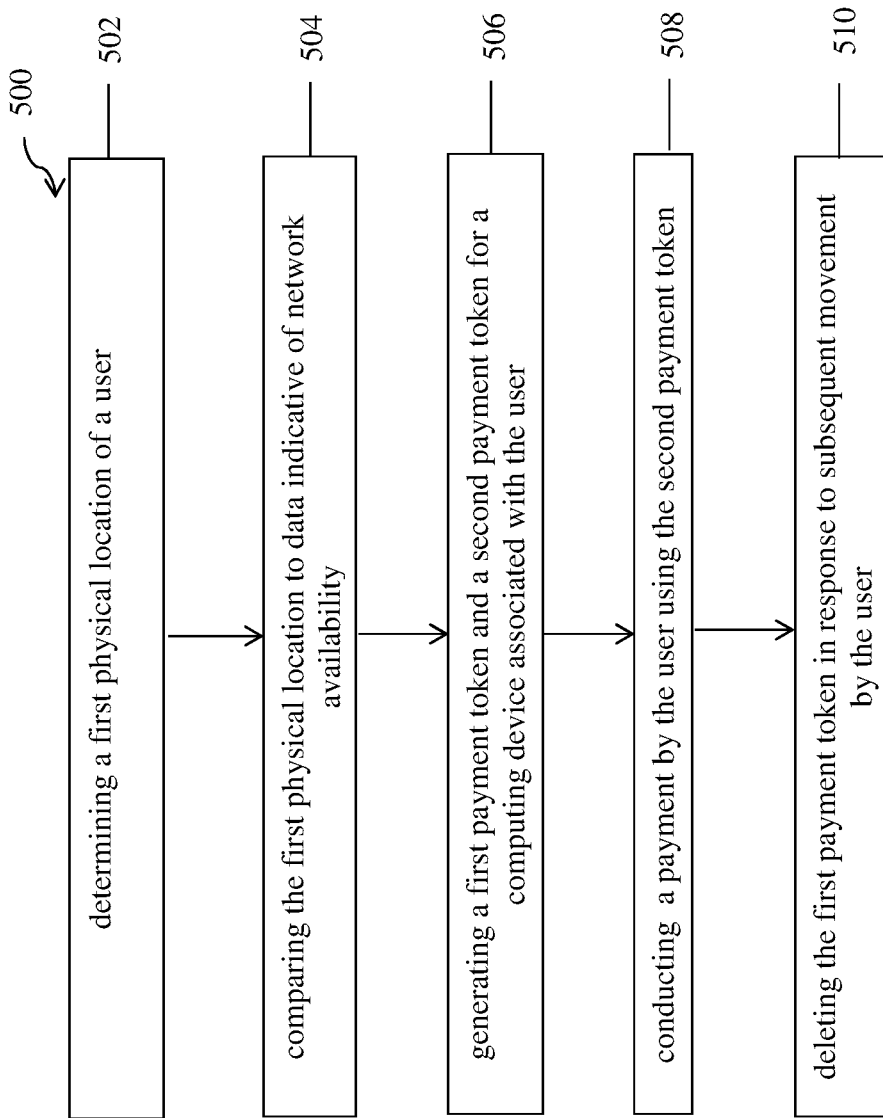
FIG. 5 is a flow chart illustrating an embodiment of a method for generating electronic tokens, according to one embodiment.

FIG. 5 is an illustration of an example method 500, adapted according to one embodiment. The actions of method 500 may be performed by a user device (e.g., user device 110) or a service provider server (e.g., server 130) or a combination thereof. The various actions are provided by the devices as a result of executing computer-readable code by one or more processors, wherein the computer-readable code includes instructions.

At action 502, an application determines a first physical location of a user. In one example, an application on a user device detects a reduction in network signal strength and, in response to the detecting, accesses a location application of the computing device. An example of a location application on the computing device includes a GPS application or other application that provides an indication of the first physical location of the user. However, in other embodiments determining the first physical location of the user may not be performed in response to detecting a reduction in network signal strength.

At action 504, an application compares the first physical location to data indicative of network availability. For instance, the application may compare the first physical location to a pre-programmed map having data correlated with network signal strength data.

Additionally or alternatively, the application may compare the first physical location to the table of pre-programmed locations correlated with network signal strength. Examples are given above with respect to FIGS. 1 and 3, wherein either or both of applications 112, 132 may access tables or map data from either of databases 116, 136. For instance, either of the databases 116, 136 may store a coverage map for one or more cellular data network providers. Furthermore, in some examples the application may retrieve signal strength values from (or other mobile coverage information) from the mobile carrier. The databases 116 and 136 may also store information regarding a transaction history of the user.

At action 506, an application generates a first payment token and second payment token for a computing device associated with the user. For instance, an application on the user's computing device may generate tokens itself, or it may request tokens from a service provider server. The tokens may be generated based on the comparing action 504 above. For instance, the tokens may be generated in response to determining that the first physical location is correlated with network signal strength below a threshold by, e.g., comparing the first physical location with a coverage map. In one example use case, a user may be heading toward a national park that lacks adequate data network coverage, and an app at the user's device or at a service provider server may generate the tokens upon recognizing that the user is headed there.

In another example, an application generates the first electronic token and the second electronic token in response to determining that the first physical location corresponds to a location of interest either in a table or on a map and that the user is within a threshold distance of the location of interest. For instance, a location of interest may include a merchant's physical location having a transaction history with the user.

At action 508, an application conducts a transaction by the user using the first electronic token. For instance, an application at the user's device may conduct a transaction by providing the first token to a merchant's POS. In another example, a service provider server may conduct a transaction by the user by receiving the token, confirming payment to the merchant, and crediting an account of the merchant according to the transaction amount.

At action 510, the application deletes the second electronic token in response to subsequent movement by the user. For instance, the user may move from the first physical location to a second physical location that has adequate network availability or is outside of a threshold distance from a location of interest. The application on the user's device may delete the second electronic token in response to the movement by the user, or it may react to a message sent by a service provider server in response to the movement by the user. Deleting unused tokens may in some embodiments help to prevent fraud or theft by reducing a number of tokens that are circulating on user devices throughout the world. Furthermore, deleting unused tokens may allow the alphanumeric strings corresponding to those tokens to be recycled and reused in later transactions. Furthermore, action 510 may be accompanied by the services provider receiving a message from the user's device indicating deletion of the first electronic token and then releasing a hold on funds associated with the first electronic token.

Figure 6:
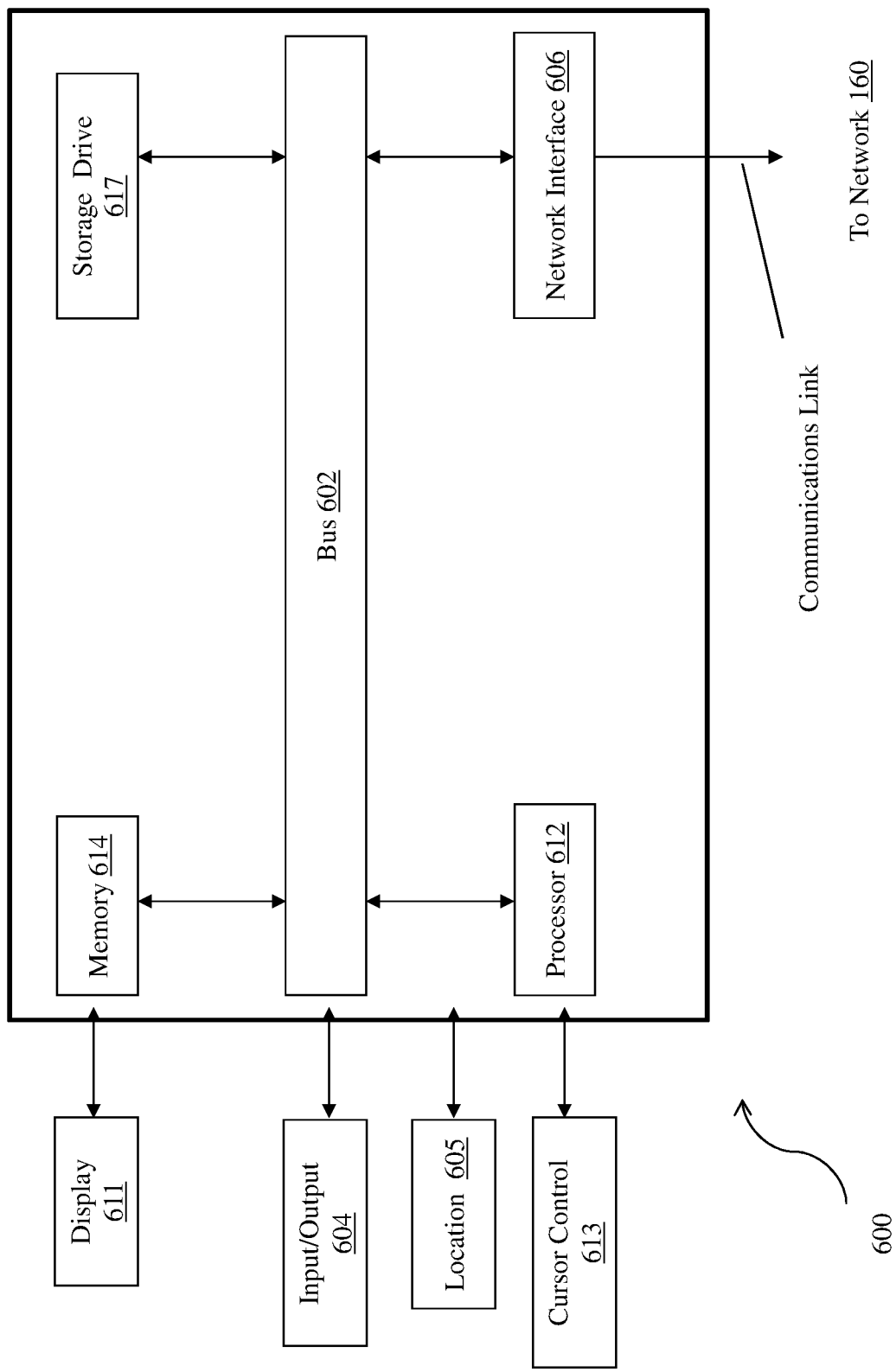
FIG. 6 is an illustration of an example computer system that may be used as a user device, a service provider server, or a merchant device and to perform the actions described with respect to FIGS. 1-5, according to one embodiment.

Referring now to FIG. 6, an embodiment of a computer system 600 suitable for implementing, for example, the computing devices 110, 120, and 130 of FIG. 1 discussed above. It should be appreciated that other devices utilized by payer, payees, and payment service providers in the system discussed above may be implemented as the computer system 600 in a manner as follows.

In accordance with various embodiments of the present disclosure, computer system 600, such as a smart phone, computer, and/or a network server, includes a bus 602 or other communication mechanism for communicating information, which interconnects subsystems and components, such as a processing component 612 (e.g., processor, microcontroller, digital signal processor (DSP), etc.), a system memory component 614 (e.g., RAM) a storage drive component 617 (e.g., solid-state, hard drive, or optical), a network interface component 606 (e.g., wireless card, modem, or Ethernet card), a display component 611 (e.g., a touchscreen, CRT, or LCD), an input/output component 604 (e.g., keyboard, keypad, a touchscreen), a cursor control component 613 (e.g., mouse, pointer, or trackball), and/or a location determination component 605 (e.g., a Global Positioning System (GPS) device as illustrated, a cell tower triangulation device, and/or a variety of other location determination devices known in the art.) In one implementation, the storage drive component 617 may comprise a database having one or more storage drive components.

In accordance with embodiments of the present disclosure, the computer system 600 performs specific operations by the processor 612 executing one or more sequences of instructions contained in the memory component 614, such as described herein with respect to FIGS. 1-5 discussed above. Such instructions may be read into the system memory component 614 from another computer readable medium, such as storage drive 617. In other embodiments, hard-wired circuitry may be used in place of or in combination with software instructions to implement the present disclosure.

Logic may be encoded in a computer readable medium, which may refer to any tangible, non-transitory medium that participates in providing instructions to the processor 612 for execution. Such a medium may take many forms, including but not limited to, non-volatile media and volatile media. In various implementations, non-volatile media includes hard drive or solid state drives, such as the storage drive component 617, and volatile media includes dynamic memory, such as the system memory component 614.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of the computer systems 600 coupled by a communication link 618 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 618 and the network interface component 606. The network interface component 606 may include an antenna, either separate or integrated, to enable transmission and reception via the communication link 618. Received program code may be executed by processor 612 as received and/or stored in storage drive component 617 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
    determining that a network signal strength of a user device, of a user, at an initial physical location of the user device is above a certain threshold where the user device can communicate with a service provider;
    determining a potential signal connectivity loss at a signal-poor venue, based on a second physical location of the user device with an expected loss of network connectivity between the user device and the service provider;
    in response to determining the potential signal connectivity loss, generating at least one token for a transaction using a transaction application, the transaction application configured for performing transactions with one or more merchant providers;
    communicating with the service provider to indicate a generation of the at least one token at the user device; and
    responsive to a determination of a loss of connectivity with the service provider, providing the at least one token to a merchant provider of the one or more merchant providers at the signal-poor venue over a Quick Response (QR) code indicating to the merchant provider that the service provider pre-authorized funds associated with the at least one token.

2. The method of claim 1, further comprising:
    communicating with a location service provider to determine the initial physical location of the user device.

3. The method of claim 1, further comprising:
    communicating with a location service provider to determine the second physical location of the user device.

4. The method of claim 1, further comprising determining that the user device is approaching the signal-poor venue based, at least in part, on correlating a direction of movement of the user device from a second physical location of the user device with an event at a third physical location of the signal-poor venue, wherein the loss of connectivity with the service provider occurs at the third physical location.

5. The method of claim 1, further comprising determining that the user device is approaching the signal-poor venue based, at least in part, on correlating a destination of the user device based on the transaction application communicating with a navigation app on the user device.

6. The method of claim 1, further comprising determining that the user device is approaching the signal-poor venue based, at least in part, on determining that a second physical location of the user is within a threshold distance of the signal-poor venue with a threshold number of other devices that each use a bandwidth of the network signal.

7. The method of claim 1, further comprising:
    determining, subsequent to generation of the at least one token, that the user device is at a signal-rich area with an expected good network connectivity; and
    communicating with the service provider, while at the signal-rich area, to delete unused tokens of the at least one token.

8. The method of claim 1, further comprising determining that the user device is approaching the signal-poor venue based, at least in part, on correlating a direction of movement of the user device from a second physical location of the user device with an event at a third physical location of the signal-poor venue.

9. The method of claim 1, wherein each of the at least one token comprises:
    a digital signature of a respective service provider that generated a respective token; and
    an indication of a respective pre-authorized amount of funds for the respective token.

10. A user device, comprising:
    a non-transitory memory storing instructions; and
    a processor configured to execute the instructions to cause the user device to:
    determine that a network signal strength of the user device at an initial physical location of the user device is above a certain threshold where the user device can communicate with a service provider;
    determine a potential signal connectivity loss at a signal-poor venue, based on a second physical location of the user device with an expected loss of network connectivity between the user device and the service provider;
    in response to determining the potential signal connectivity loss, generate a plurality of tokens for a transaction using a transaction application, the transaction application configured for performing transactions with one or more merchant providers; and
    responsive to a determination of a loss of connectivity with the service provider, provide a Quick Response (QR) code that comprises a first token of the plurality of tokens to a merchant provider of the one or more merchant providers, the QR code indicating to the merchant provider that the service provider pre-authorized funds associated with the first token.

11. The user device of claim 10, wherein executing the instructions further causes the user device to communicate with the service provider to indicate a generation of the plurality of tokens at the user device.

12. The user device of claim 10, wherein executing the instructions further causes the user device to determine that the user device is approaching the signal-poor venue based, at least in part, on correlating a direction of movement of the user device from a second physical location of the user device with an event at a third physical location of the signal-poor venue.

13. The user device of claim 10, wherein executing the instructions further causes the user device to determine that the user device is approaching the signal-poor venue based, at least in part, on correlating a destination of the user device based on the transaction application communicating with a navigation app on the user device.

14. The user device of claim 10, wherein executing the instructions further causes the user device to determine that the user device is approaching the signal-poor venue based, at least in part, on determining that a second physical location of the user is within a threshold distance of the signal-poor venue with a threshold number of other devices that each use a bandwidth of the network signal.

15. The user device of claim 10, wherein executing the instructions further causes the user device to,
  determine, subsequent to generation of the plurality of tokens, that the user device is at a signal-rich area with an expected good network connectivity; and
  communicate with the service provider, while at the signal-rich area, to indicate deletion of unused tokens of the plurality of tokens.

16. A non-transitory machine-readable medium having instructions stored thereon, the instructions executable to cause performance of operations comprising:
  determining that a network signal strength of a mobile device at an initial physical location of the mobile device is above a certain threshold where the mobile device can communicate, via a network characterized by the network signal strength, with a service provider;
  determining a probability above a threshold that the mobile device will experience a loss of network connectivity of the network with the service provider;
  in response to determining the probability above the threshold that the mobile device will experience the loss of network connectivity, generating a plurality of tokens for a transaction using a transaction application, the transaction application configured for performing transactions with one or more merchant providers; and
  responsive to a determination of a loss of connectivity with the service provider, provide a Quick Response (QR) code or a near field communication (NFC) data that comprises a first token of the plurality of tokens to a merchant provider of the one or more merchant providers, the QR code or the NFC data indicating to the merchant provider that the service provider pre-authorized funds associated with the first token.

17. The non-transitory machine-readable medium of claim 16, wherein the operations further comprise communicating with the service provider to indicate the generation of the plurality of tokens at the mobile device.

18. The non-transitory machine-readable medium of claim 16, wherein determining the probability above the threshold that the mobile device will experience the loss of network connectivity comprises correlating a destination of the mobile device as obtained from a navigation app on the mobile device with an event at a second physical location of the mobile device.

19. The non-transitory machine-readable medium of claim 16, wherein each of the plurality of tokens comprises:
  a digital signature of a respective service provider that generated a respective token; and
  an indication of a respective pre-authorized amount of funds for the respective token.

20. The non-transitory machine-readable medium of claim 16, wherein determining the probability above the threshold that the mobile device will experience the loss of network connectivity of the network with the service provider is based on predicting the loss of network connectivity at a likely next physical location of the mobile device.

* * * * *